(12) United States Patent
Hamada et al.

(10) Patent No.: US 7,255,446 B2
(45) Date of Patent: Aug. 14, 2007

(54) PROJECTION TYPE VIDEO DISPLAY

(75) Inventors: Fumihiko Hamada, Osaka (JP); Akira Miyanaga, Osaka (JP); Masaaki Miyamoto, Osaka (JP); Takaharu Adachi, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 102 days.

(21) Appl. No.: 11/084,013

(22) Filed: Mar. 21, 2005

(65) Prior Publication Data
US 2005/0213049 A1 Sep. 29, 2005

(30) Foreign Application Priority Data
Mar. 23, 2004 (JP) .............................. 2004-085056

(51) Int. Cl.
*G03B 21/16* (2006.01)
(52) U.S. Cl. .................... 353/61; 353/57; 353/119; 348/748
(58) Field of Classification Search ............ 353/57–61, 353/119; 348/748
See application file for complete search history.

(56) References Cited

U.S. PATENT DOCUMENTS

| | | | |
|---|---|---|---|
| 5,676,442 A | 10/1997 | Fujimori | |
| 5,743,610 A | 4/1998 | Yajima et al. | |
| 6,443,575 B1 | 9/2002 | Miyamoto et al. | |
| 6,481,854 B1 | 11/2002 | Sugawara et al. | |
| 6,513,936 B1 * | 2/2003 | Ishiwa et al. | 353/56 |
| 6,641,267 B2 * | 11/2003 | Ohishi et al. | 353/61 |
| 6,746,125 B2 * | 6/2004 | Nakano et al. | 353/61 |
| 2003/0164926 A1 | 9/2003 | Nakano et al. | |
| 2004/0223237 A1 * | 11/2004 | Yanagisawa et al. | 359/820 |

FOREIGN PATENT DOCUMENTS

| | | |
|---|---|---|
| EP | 0 834 765 A1 | 4/1998 |
| EP | 1 065 552 A2 | 1/2001 |
| JP | 9-49998 | 2/1997 |
| JP | 2002341448 | 11/2002 |
| JP | 2002-352612 | 12/2002 |
| JP | 2003241316 | 8/2003 |

OTHER PUBLICATIONS

Communication dated Jul. 5, 2005 from European Patent Office in Application No. 05 00 6260 enclosing European Search Report.

* cited by examiner

*Primary Examiner*—W. B. Perkey
*Assistant Examiner*—Andrew Sever
(74) *Attorney, Agent, or Firm*—Westerman, Hattori, Daniels & Adrian, LLP.

(57) ABSTRACT

A projection type video display capable of reducing components in number, and attempting to improve a cooling efficiency and a silencing of the video display is provided. Three cooling fans are provided on a plate member arranged within a chassis of the video display of a liquid crystal projector. The plate member is arranged in such a manner as to be spaced apart from a bottom plate of a chassis of the video display in order to form a single external-air introducing duct. Double-bottomed structure is formed by the plate member, and the plate member is used as a bottom for arranging components. Each cooling fan sucks external air from the single external-air introducing duct, and blows the external air from a blowing duct to an object to be cooled (a light source, a liquid crystal display, and others).

8 Claims, 5 Drawing Sheets

PROJECTION TYPE VIDEO DISPLAY

BACKGROUND OF THE INVENTION

Field of the Invention

The present invention relates to a projection type video display such as a liquid crystal projector, and others. The projection type video display includes a single panel type provided with one piece of a full color video display panel, a three-panel type provided with three pieces of video display panels for respective colors, and others. In addition, as the video display panel, there are a mirror device panel, which is formed by arranging a multiplicity of liquid crystal display panels and micro mirrors, and others. FIG. 5 is a descriptive diagram showing an optical system of the three-panel type color liquid crystal projector as one example. As a light-emitting portion of a light source 1, an ultra-high pressure mercury lamp, a metal halide lamp, a xenon lamp, and others are used, and an irradiating light, which is rendered a parallel light by a parabolic reflector 3, is emitted and introduced into an integrator lens 4.

The integrator lens 4 is constituted of one pair of fly's eye lenses 4a, 4a, and each lens-pair is to introduce a light emitted from the light source 1 to an entire surface of liquid crystal light valves 31, 32, and 33. The light via the integrator lens 4, after being adjusted to an S-polarized light, for example, by a polarization conversion system 5, is introduced into a first dichroic mirror 8.

The first dichroic mirror 8 transmits a light in a red wavelength band, and reflects a light in a cyan (green+blue) wavelength band. The light in a red wavelength band that passes through the first dichroic mirror 8 is reflected by a reflection mirror 9, and has an optical path changed. The light in red reflected by the reflection mirror 9, via a condenser lens 10, is introduced to the transmission type liquid crystal light valve 31 for red light, and as a result of passing through the light valve, the light in red is optically modulated. On the other hand, the light in a cyan wavelength band reflected by the first dichroic mirror 8 is introduced into a second dichroic mirror 11.

The second dichroic mirror 11 transmits a light in a blue wavelength band, and reflects a light in a green wavelength band. The light in a green wavelength band reflected by the second dichroic mirror 11, via a condenser lens 12, is introduced into the transmission type liquid crystal light valve 32 for green light, and as a result of passing through the light valve, optically modulated. In addition, the light in a blue wavelength band that passes through the second dichroic mirror 11, via reflection mirrors 14, 16, relay lenses 13, 15, and a condenser lens 17, is introduced into the transmission type liquid crystal light valve 33 for blue light, and as a result of passing through the light valve, is modulated in light.

Each liquid crystal light valve 31, 32, and 33 is formed of being provided with emission-side polarizing plates 31a, 32a, and 33a, panel portions 31b, 32b, and 33b formed by sealing a liquid crystal between one pair of glass plate (in which a pixel electrode and an alignment film are formed), and emission-side polarizing plates 31c, 32c, and 33c. Modulated lights (video lights in respective colors) modulated by being via the liquid crystal light valves 31, 32, and 33 are combined by a dichroic prism 18, and rendered a color video light. The color video light is enlarged and projected by a projection lens 19, and displayed on a screen 20.

FIG. 4 is a sectional view showing a conventional sucking structuring portion in the projection type video display. Sucking portions 70 are provided in plural in a plurality of locations within the video display in order to supply air for cooling. Each sucking portion 70 is provided with an external-air introducing duct 71 arranged on a bottom portion of a chassis of the video display. On the bottom portion, formed are a plurality of apertures 72, external air passes through the aperture 72, and after having dust removed by a filter 73, is introduced within the external-air introducing duct 71. On the external-air introducing duct 71, a cooling fan 74 is provided. As a result of the cooling fan 74 rotating, the external air sucked by the external-air introducing duct 71 is introduced within a blowing duct 75, and the introduced external air is to be blown to each of components 76 to be cooled.

It is noted that a liquid crystal projector provided with a cooling fan and a duct is known (Japanese Patent Laying-open No. 9-49998). Structure that cools a lamp reflector, too, is known (Japanese Patent Laying-open No. 2002-352612).

SUMMARY OF THE INVENTION

However, the above-described conventional sucking structuring portion is structure in which external-air introducing ducts 71 are provided to each of fans 74 so that the number of components increases. In addition, it is desired to perform a more efficient cooling, and aim to render the video display more silent.

In view of the above-described circumstance, it is an object of the present invention to provide a projection type video display capable of reducing the number of components, and attempting to increase a cooling efficiency and render the video display silent.

In order to solve the above-described problem, a projection type video display of the present invention is a projection type video display that modulates a light emitted from a light source by a video display panel, and projects this modulated light by a projection lens, and comprises a plurality of cooling fans, a plate member arranged in such a manner as to be spaced apart from a bottom portion of a chassis of a video display so as to form double-bottomed structure in order to form a single external-air introducing duct, and each cooling fan is configured in such a manner as to suck the external air from the single external-air introducing duct.

The above-described configuration is structure in which a single external-air introducing duct is arranged toward a plurality of cooling fans so that, compared to structure in which the external-air introducing ducts are arranged to each of cooling fans as conventionally, the structure is rendered simple, and the number of components, too, are reduced. In addition, the plate member is arranged in such a manner as to be spaced apart from a bottom potion of the chassis of the video display so as to form double-bottomed structure, thus becoming easy to secure a capacity necessary for a suction of the plurality of cooling fans. As a result, a charge of the cooling fans becomes reduced, and this enables to implement to drive the cooling fan by a lower power, reduce a fan sound resulting from the lower power, and so on.

In a projection type video display of the above-described configuration, it is preferable to be configured in such a manner that components other than the cooling fan, too, are arranged on the plate member. According thereto, there exists in a double-layered manner a components-arranging space to be formed on an upper side of the plate member, and the external-air introducing duct to be formed at a lower side of the plate member. That is, the components-arranging space that results in high temperature, and the external-air introducing duct intended to keep a low temperature state are to be spaced apart in terms of heat by the plate member, thus obtaining an improved cooling effect.

In a projection type video display of these configurations, it may be configured in such a manner that a wall portion of the chassis rising from the bottom portion of the chassis of the video display forms the external-air introducing duct. According thereto, it becomes easy to secure a large capacity in the external-air introducing duct. As the wall portion of the chassis, a side-surface wall portion, and a rear-surface wall potion of the chassis of the video display may be utilized.

In a projection type video display of these configurations, the external-air introducing duct may exist in an area across a far side seen from a location in which a projection lens is arranged and a rear of the chassis. In addition, in this configuration, a bottom potion of the chassis of a video display protrudes downwardly in the area across a far side seen from a location in which a projection lens is arranged and the rear of the chassis, and the external-air introducing duct may exist within this protruding bottom potion. Thus, the configuration in which the external-air introducing duct exists within the protruding bottom portion enables to form an aperture for introducing the external air not only in the bottom portion in the protruding bottom portion but also in the wall in the protruding bottom portion.

In a projection type video display of these configurations, the external-air introducing duct may be formed in such a manner as to avoid an area in which an AC plug is arranged. In addition, in a projection type video display of these configurations, it may be possible to have a blowing duct for blowing to an object to be cooled air blown from each fan, and that the blowing duct is formed to be integrated with the plate member.

The foregoing and other objects, features, aspects and advantages of the present invention will become more apparent from the following detailed description of the present invention when taken in conjunction with the accompanying drawings.

BRIEF DESCRIPTION OF THE DROWINGS

FIG. 1A and FIG. 1B are views showing an outline of external-air introducing structure of a liquid crystal projector of an embodiment of the present invention, of which FIG. 1A is a perspective plan view, and FIG. 1B is an A-A cross sectional view;

DESCRIPTION OF THE PREFERRED EMBODIMENTS

Figure 5:
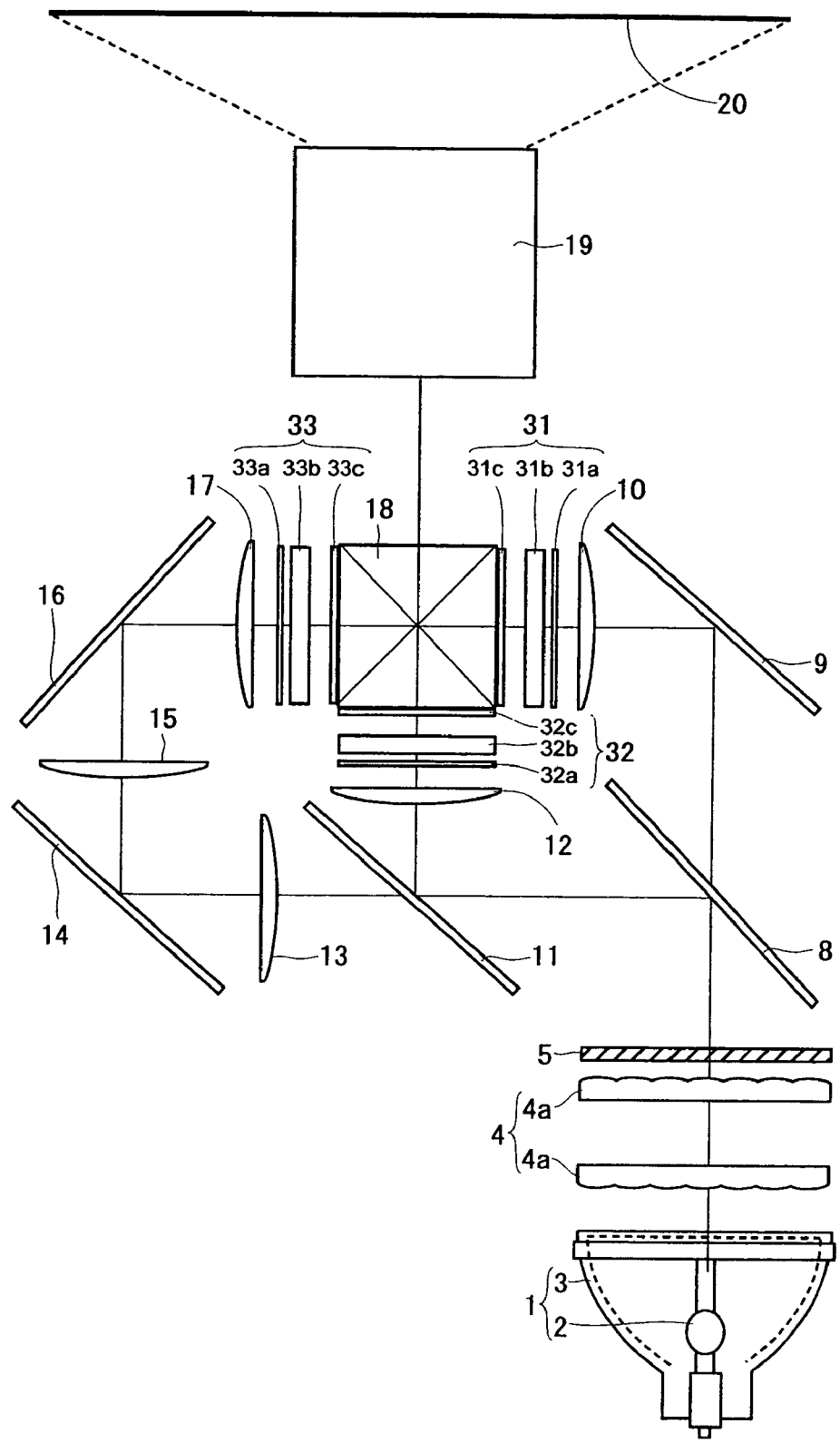
FIG. 5 is a descriptive diagram showing an example of an optical system of a liquid crystal projector.

Below, a projection type video display of an embodiment of the present invention will be described based on FIG. 1 to FIG. 3. It is noted that in this embodiment, the projection type video display is a liquid crystal projector that uses three transmission type liquid crystal display panels, and a video generating optical system thereof is the same as the liquid crystal projector in FIG. 5 so that descriptions regarding the video generating optical system will be omitted, and primarily, external-air introducing structure will be described.

Figure 1A:
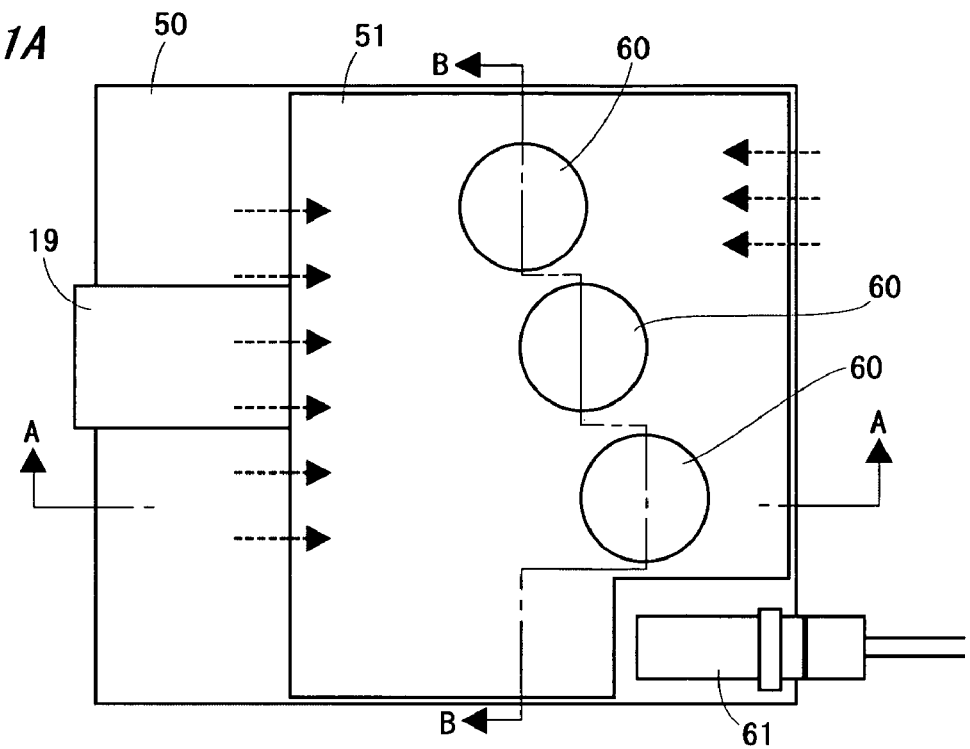
Figure 1B:
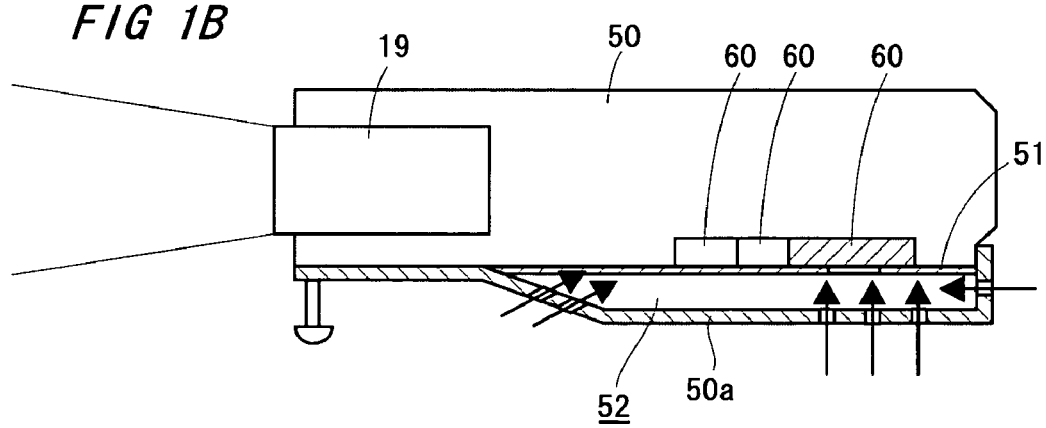
Figure 2:
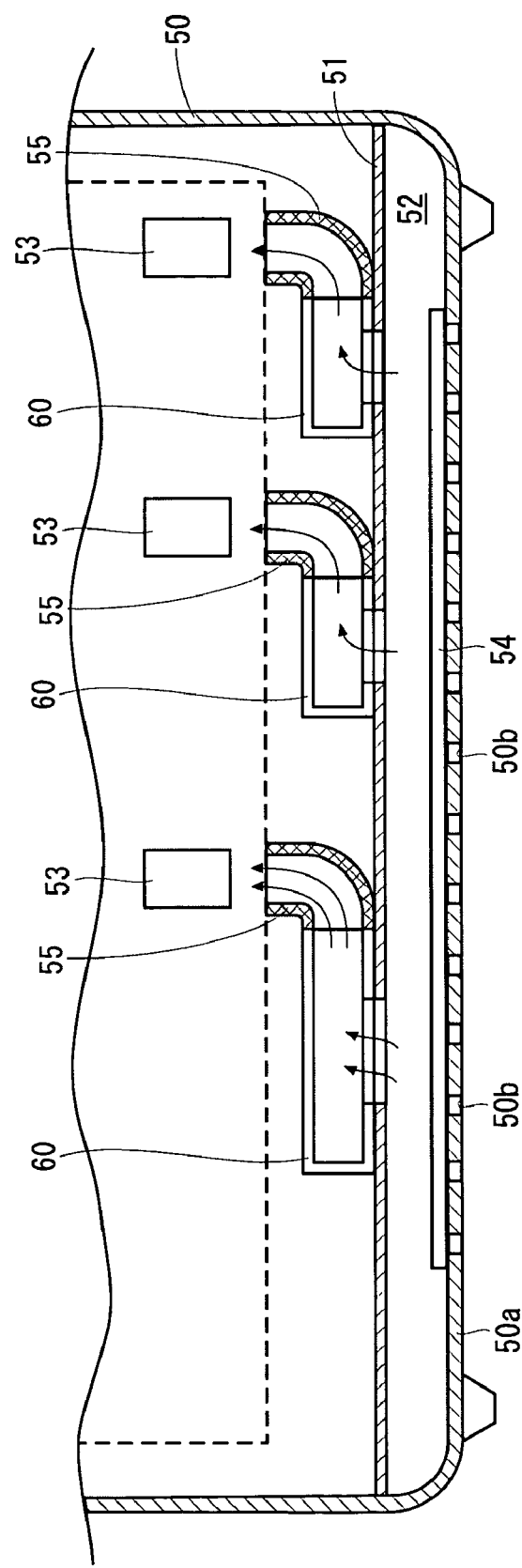
FIG. 2 is a B-B cross-sectional view of FIG. 1A.

As shown in FIG. 1A, FIG. 1B, and FIG. 2, on a plate member 51 arranged within the liquid crystal projector, three cooling fans 60 (a sirocco fan, for example) are provided. The plate member 51 is provided in such a manner as to be spaced apart from a bottom plate 50a of a chassis 50 of a video display in order to form a single external-air introducing duct 52. The plate member 51 allows to form double-bottomed structure, and the plate member 51 is utilized as a base for arranging components. That is, an optical unit, and others are arranged on the plate member 51. The external-air introducing duct 52 has at least a capacity necessary for a suction of the three cooling fans 60.

In the bottom plate 50a, boss portions with screw hole not shown are formed, for example, and the plate member 51 is supported by the boss portion with screw hole. As a result of a screw not shown being screwed together with the boss portion with screw hole, the plate member 51 is fixed to the boss portion. Supporting and fixing structure of the plate member 51 is not limited to such the structure.

Each cooling fan 60 sucks external air from a single external-air introducing duct 52, and blows the external air from a blowing duct 55 to an object 53 to be cooled. The object 53 to be cooled includes a light source 1, liquid crystal display panels 31, 32, and 33, and others. A plurality of apertures 50b are formed in the bottom plate 50a. The external air passes through the aperture 50b, has dust removed by a filter 54, and is introduced within the external-air introducing duct 52.

The plate member 51 has a width across a left-side wall portion and a right-side wall portion of the chassis 50 of the video display, and the left-side wall portion, the right-side wall portion, and a rear-side wall portion that rise from the bottom plate 50a of the chassis of the video display form the external-air introducing duct 52. In addition, the bottom plate 50a of the chassis 50 of the video display protrudes downwardly in an area across a far side seen from a location in which the projection lens 19 is arranged and a rear surface of the chassis 50a, and within this protruding bottom portion, the external-air introducing duct 52 exists. In the bottom plate 50, not only on the bottom surface but also in a rear-surface portion, a front-surface portion, and a side-surface portion, the apertures 50b are formed.

Furthermore, at a lower side of a left corner on the rear-surface side of the chassis 50 of the video display, an AC plug 61 is provided. The external-air introducing duct 52 is formed in such a manner as to avoid an area in which the AC plug 61 is arranged.

The above-described configuration is structure in which the single external-air introducing duct 52 is provided toward a plurality of the cooling fans 60 so that, compared to structure in which external-air introducing ducts are provided to each of cooling fans as conventionally, the structure is rendered simple, and the number of components (the number of duct constituting members, the number of filters, and others) is reduced. Furthermore, it is easy to secure in the external-air introducing duct 52 a capacity necessary for a suction of the plurality of the cooling fans 60 so that a charge of the cooling fan 60 is reduced, thus possible to implement to drive the cooling fan 60 by a lower power, and reduce a sound of the fan resulting from the lower power, and others.

The double-bottomed structure is formed by the plate member 51, the plate member 51 is utilized as a base for arranging an optical unit, and others. As a result, a components-arranging space that results in high temperature, and the external-air introducing duct 52 intended to keep low temperature are spaced apart in terms of heat by the plate member 51. This leads to an improved cooling effect. The plate member 51 may be configured of a material having an improved heat-shielding effect other than metal, or structured of a heat-shielding material being attached using the metal as a base.

The wall portion of the chassis rising from the bottom portion of the chassis 50 of the video display constitutes the external-air introducing duct 52 so that it is easy to secure a large capacity in the external-air introducing duct 52. Furthermore, the bottom plate 50a of the chassis 50 of the video display protrudes downwardly in an area across a far side seen from a location in which a projection lens 19 is arranged and the rear of the chassis, and the external-air introducing duct 52 is configured to exist within this protruding bottom portion so that it becomes possible to form the aperture for introducing the external air not only on the bottom surface of the protruding bottom portion but also in the wall of the protruding bottom portion, thus easy to suck the external air within the external-air introducing duct 52.

If the AC plug 61 is provided on a lower-portion side of the rear of the video display, it becomes easy to handle when mounting an electrical chord. The external-air introducing duct 52 is formed in such a manner as to avoid an area in which the AC plug 61 is arranged so that it is possible to realize an arrangement in which the AC plug 61 is provided on the lower-side portion of the rear of the video display.

Figure 3:
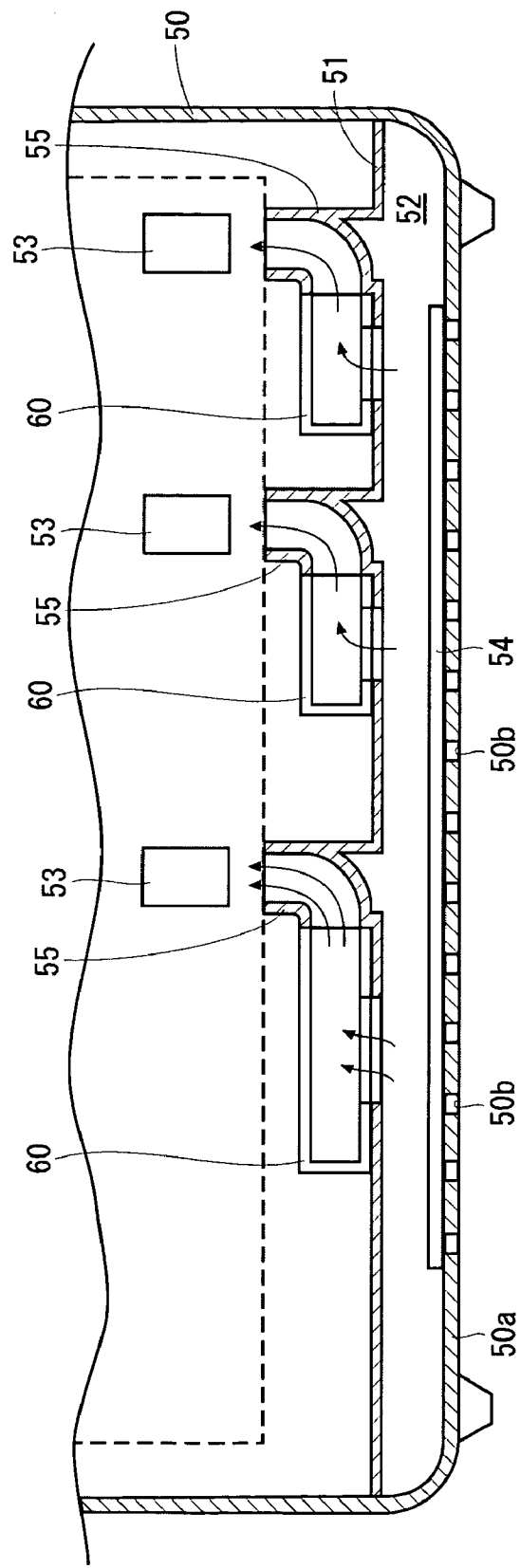
FIG. 3 is a view showing a modified example of external-air introducing structure, and a view that corresponds to the B-B cross-sectional view of FIG. 1A.
Figure 4:
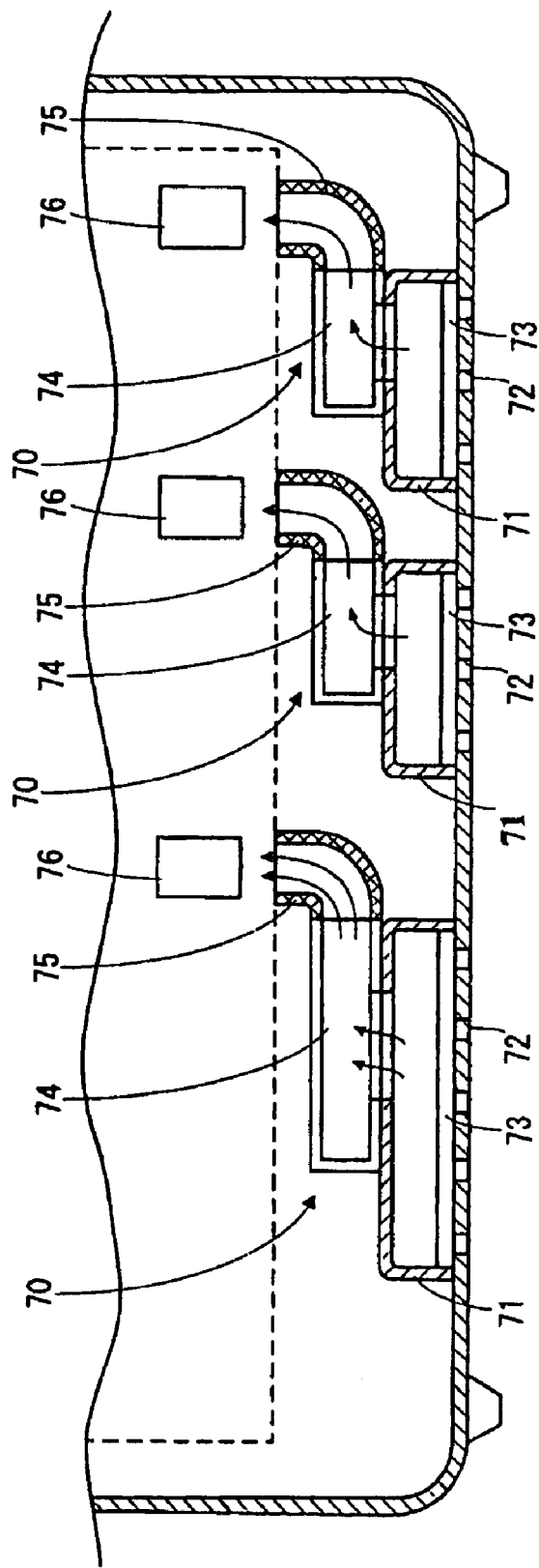
FIG. 4 is a sectional view showing conventional external-air introducing structure in a projection type video display.

FIG. 3 is a view showing another example of the external-air introducing structure, and a view that corresponds to a B-B cross-sectional view of FIG. 1A. In the external-air introducing structure shown in FIG. 3, the plate member 51 and the blowing duct 55 are formed in an integrated manner. With such the configuration, compared to the configuration in which the blowing duct 55 and the plate member 51 are rendered separate components, the number of components is further reduced. In addition, it becomes easy to perform an assembling task.

It is noted that in the above-described examples, a video generating optical system that uses the three transmission type liquid crystal display panels is shown. However, this is not always the case, and another video generating optical system may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display that modulates light emitted from a light source by a video display panel, and projects this modulated light by a projection lens, comprising a plurality of cooling fans, a plate member arranged in such a manner as to be spaced apart from a bottom portion of a chassis of the video display so as to from double-bottomed structure in order to form a single external-air introducing duct, wherein a plurality of apertures are formed in the bottom portion, and each cooling fan is configured in such a manner as to suck external air from said single external-air introducing duct via the apertures being located below the plate member.

2. A projection type video display according to claim 1, configured in such a manner that components other than the cooling fan, too, are arranged on said plate member.

3. A projection type video display according to claim 1, configured in such a manner that a wall of the chassis of the video display rising from the bottom portion of chassis of the video display forms said external-air introducing duct.

4. A projection type video display according to claim 3, wherein a side-surface wall portion, and a rear-surface wall portion of the chassis of the video display are utilized as said wall of the chassis.

5. A projection type video display according to claim 1, wherein said external-air introducing duct exists in an area across a far side seen from a location in which a projection lens is arranged and a rear of the video display.

6. A projection type video display according to claim 5, wherein a bottom portion of a chassis of a video display protrudes downwardly in the area across a far side seen from a location in which a projection lens is arranged and a rear of the video display, and said external-air introducing duct exists within this protruding bottom portion.

7. A projection type video display according to claim 1, wherein said external-air introducing duct is formed in such a manner as to avoid an area in which an AC plug is arranged.

8. A projection type video display according to claim 1, having a flowing duct for blowing to an object to be cooled air blown from each fan, and said blowing duct being formed to be integrated with said plate member.

* * * * *